United States Patent [19]

Lederman

[11] Patent Number: 4,815,577
[45] Date of Patent: Mar. 28, 1989

[54] ROLLER CLUTCH WITH PROTECTED AND GUIDED ENERGIZING SPRINGS

[75] Inventor: Frederick E. Lederman, Sandusky, Ohio

[73] Assignee: General Motors Corporation, Detroit, Mich.

[21] Appl. No.: 120,413

[22] Filed: Nov. 13, 1987

[51] Int. Cl.⁴ .................. F16D 15/00; F16D 41/06
[52] U.S. Cl. .................................................. 192/45
[58] Field of Search .................. 192/45; 188/82.84

[56] References Cited

U.S. PATENT DOCUMENTS 3,942,616 3/1976 Elmore .............................. 192/45
4,711,330 12/1987 Lederman ......................... 192/45

FOREIGN PATENT DOCUMENTS 1213177 3/1966 Fed. Rep. of Germany .
1254916 11/1967 Fed. Rep. of Germany .

Primary Examiner—Rodney H. Bonck
Attorney, Agent, or Firm—Patrick M. Griffin

[57] ABSTRACT

A roller clutch in which the active portions of the energizing springs extend outside of an along the side rails of the clutch cage, and are thereby maximized working length, and protected and guided by the side rails during clutch operation.

3 Claims, 3 Drawing Sheets

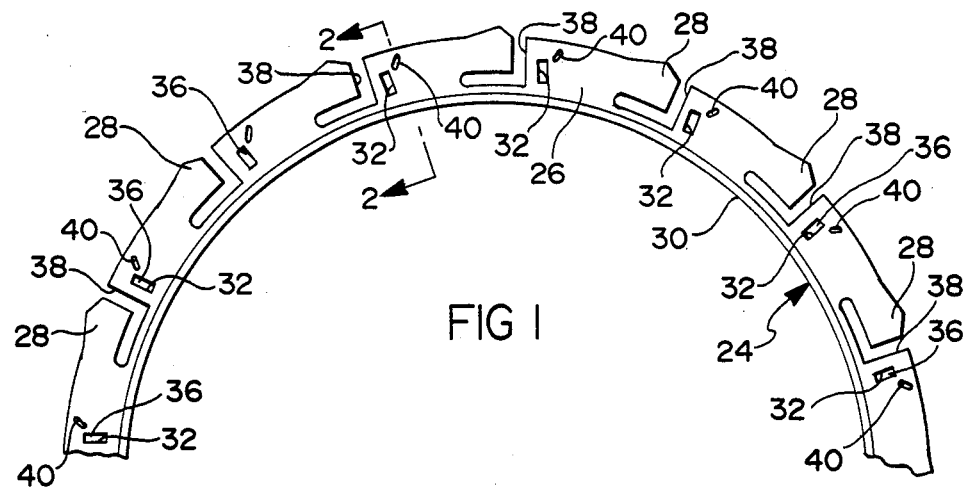
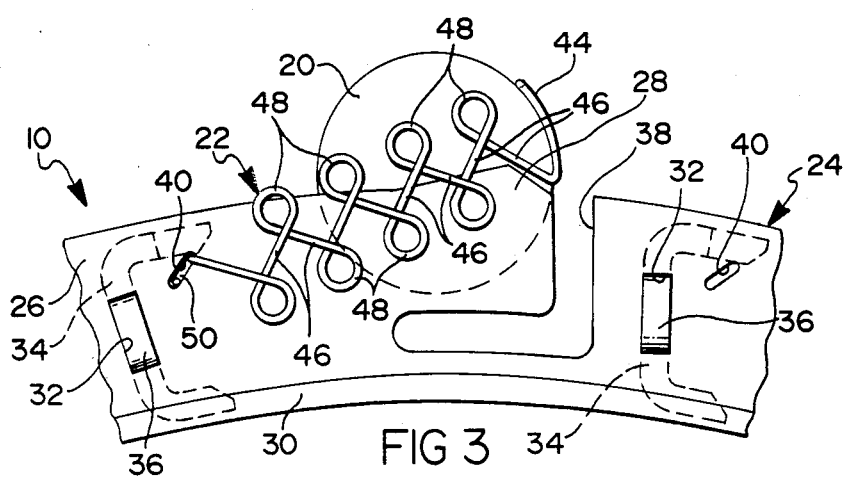

ROLLER CLUTCH WITH PROTECTED AND GUIDED ENERGIZING SPRINGS

This invention relates to roller clutches in general, and specifically to a roller clutch in which the roller energizing springs are well protected from the rollers as the move, and also help to prevent the rollers from skewing as the clutch operates.

BACKGROUND OF THE INVENTION

Roller clutches, which are often found in automatic transmission applications, generally include a plurality of spring energized rollers, each of which is located between a cylindrical pathway on one race and one of a series of sloped cam ramps on a coaxial cam race. A great advantage of roller clutches is that each roller, given its independent spring energizing, automatically self seeks its own unique and optimal ready position during overrun, that is, the position where it will be lightly engaged between the pathway and its cam ramp, ready to quickly jam between the races when overrun conditions end. As the clutch overruns, each roller moves up and down its cam ramp, generally called roller travel, which can be quite rapid, and must be allowed to occur freely. It is also desirable that the rollers be maintained parallel to the race axis as they travel.

The typical roller clutch includes a fairly rigid cage, which provides its basic structural framework, and which also retains the rollers and mounts the energizing springs. The cage-roller-spring unit can then be installed in one step between the clutch races, with the cage sliding over and locking to the cam race. After installation, the cage remains generally coaxial to the races. Each roller is usually retained by the cage in an individual roller retention pocket defined by a pair of axially spaced side rails of the cage. These side rails may be metal end rings, extensions of a plastic journal block, or any other cage structure that will suitably axially confine the rollers as they travel. Because the clutch cage is maintained substantially coaxial to the races after installation, the side rails of the retention pockets are maintained generally perpendicular to the axis of the races, and provide some measure of guidance to keep the rollers parallel to the race axis as the roller ends slide along the inside surfaces of the side rails. However, the inside surfaces of the retention pocket side rails must have a fair degree of clearance from the roller ends, so as not to interfere with their free travel, and so cannot rigorously guide the rollers. The rollers are thus subject to being skewed away from the race axis, especially at high speeds, or where external roller disturbing forces are present.

The typical roller energizing spring is an accordion type compression spring that is also located within the roller retention pocket, compressed between its respective roller and a spring mounting portion of the cage, which is generally a cage cross bar. Therefore, the working length of the spring is limited to the room available between the roller and the cage cross bar. The spring is not particularly strong or stiff, as it must move back and forth freely with the roller, and would add to race wear if it were too strong. Consequently, the spring generally follows the roller without providing significant roller guidance. Furthermore, the spring is potentially subject to being disturbed or damaged by the roller as it moves. Often, the roller is subject to various external forces during clutch overrun that can skew it off axis or move it so far down the cam ramp that it loses contact with one or both race surfaces, generally referred to as roller pop out. In such cases, the spring is subject to warping and kinking, and may potentially lose contact with the roller altogether, or be over compressed. Such considerations may dictate the use of a more costly sprag clutch in such an environment.

SUMMARY OF THE INVENTION

The invention provides a roller clutch with an improved energizing spring that is better protected from the roller, and which can provide significant skew control to the roller. The preferred embodiment disclosed includes a cage with a pair of axially spaced and parallel metal side rails that define a plurality of roller retention pockets, and which are maintained generally perpendicular to the race axis after the clutch is installed between the races. Each roller fits entirely within the side rails of an individual retention pocket, engaged with a respective cam ramp of the cam race, with the near side of the roller facing up the cam ramp, and the far side facing down the cam ramp. The energizing spring for each roller, which is generally U shaped, is not located entirely within the retention pocket. The front of the U, which is a roller conforming loop that engages the far side of the roller, is located within the roller pocket, running between the side rails. The ends of the U, which comprise the base of the spring, are fixed to the cage side rails, facing the near side of the roller. The sides of the U, which comprise the active portion of the spring, each consist of a series of V shaped folds that are disposed generally in the plane. The planar V folds extend from the base closely along the outside of both side rails, and the forwardmost V fold on each side extends through a slot in the side rail to the contact loop, to which they are rigidly joined in a perpendicular relation. The spring acts in tension to pull the roller up the cam ramp, rather than in compression to push it up the cam ramp, and the working length of the active portions of the spring are thereby maximized within the circumferential space available. As the roller travels, the active folds are totally protected from the roller by the side rails, and are not subject to warping, twisting, or over compression. The planar V folds of the spring are also thereby guided by the side rails, and maintain the contact loop generally perpendicular to the cage side rails. As a consequence, the contact loop is maintained parallel to the race axis, and significant skew control is provided to the roller.

It is, therefore, an object of the invention to provide a roller clutch energizing spring that is better protected, and which provides better skew control to the roller.

It is another object of the invention to provide such spring protection by running the active portions of the spring outside of the cage side rails, where they will be protected from the roller.

It is another object of the invention to provide skew control to the roller by guiding the active portions of the spring with the outside of the cage side rails.

It is yet another object of the invention to maximize the working length of the spring by using a tension spring that extends along the outside of the cage side rails all the way to the far side of the roller.

DESCRIPTION OF THE PREFERRED EMBODIMENT

These and other objects and features of the invention will appear from the following written description, and from the drawings, in which:

FIG. 1 is an end view of part of the cage of the preferred of embodiment the invention;

FIG. 2 is a sectional view taken along the line 2—2 of FIG. 1;

FIG. 3 is an end view of a portion of the cage showing a roller and spring being installed;

FIG. 4 is an enlarged view like FIG. 2, showing a roller and spring in place;

Figure 6:
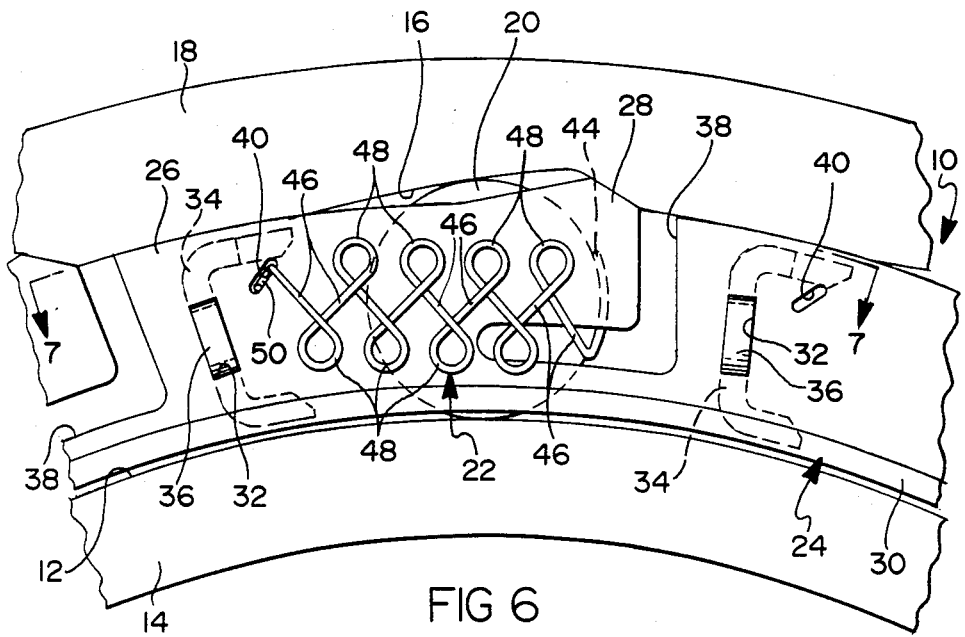
FIG. 6 is a view like FIG. 5, but after the pathway race has been added, and showing a normal position of the roller.

Referring first to FIG. 6, a preferred embodiment of the one way roller clutch of the invention is designated generally at 10. Clutch 10 is of the type that is installed between a cylindrical pathway 12 on one clutch race, here the inner race 14, and a circumferentially spaced series of sloped cam ramps 16 formed on a coaxial outer clutch race 18. Clutch 10 has a complement of cylindrical rollers 20, one for each cam ramp 16, which jam between the races 14 and 18 to lock them together whenever inner race 14 attempts to rotate counter clockwise relative to outer race 18. Conversely, when inner race 14 attempts to rotate clockwise relative to outer race 18, the rollers 20 are freed and inner race 14 overruns or freewheels. During overrun, each roller 20 must independently move continually up and down its respective cam ramp 16 in order to stay lightly engaged between pathway 12 and the respective cam ramp 16, the position where it is ready to cause lockup when conditions change. This independent up and down, back and forth, movement of each roller 20 is generally called roller travel. Free, unencumbered roller travel is necessitated by the fact that the races 14 and 18, although generally coaxial, rotate with some relative eccentricity, so that the cam ramps 16 will continually, and rapidly, move toward and away from the pathway 12. Individually acting roller energizing springs, designated generally at 22, make the free and independent travel of each roller 20 possible, as will be described further below.

Figure 7:
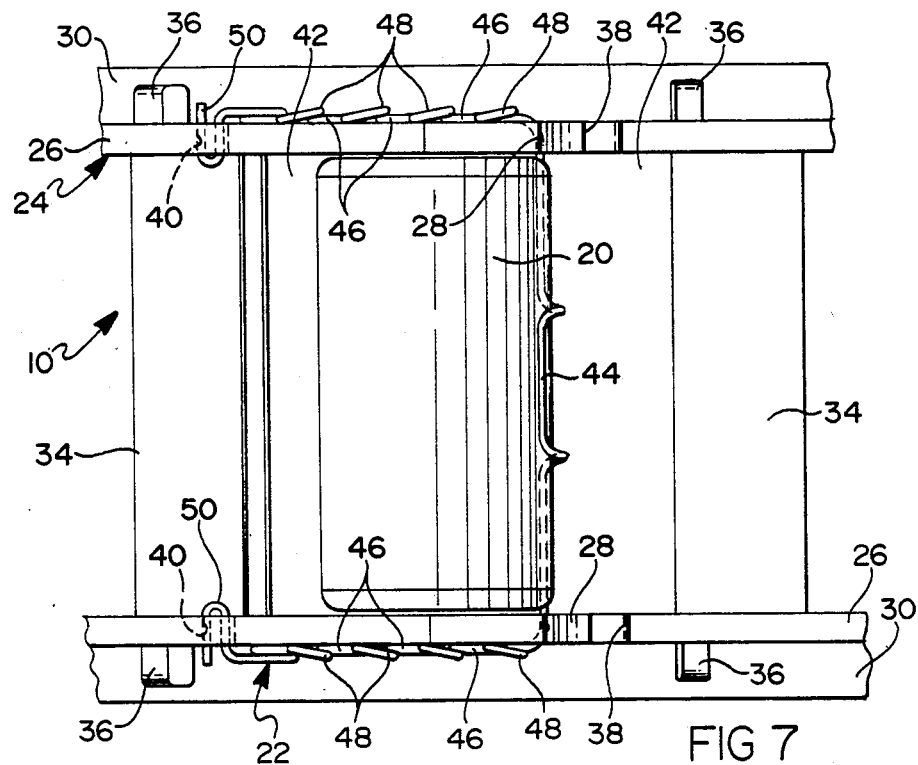
FIG. 7 is a view taken along the line 7—7 of FIG. 6.

Referring next to FIGS. 1, 2 and 7, the basic structural framework of clutch 10 is provided by a cage, designated generally at 24, which, in the particular embodiment shown, is made up of two parallel and axially spaced metal side rails 26. Each side rail 26 is stamped of steel, and includes several conventional features, including cam locking ears 28 on the OD, one of which slide fits to each cam ramp 16, L shaped bearing flanges 30, which ride on the pathway 14, and cross bar slots 32. The ends of cross bars 34 are received through the cross bar slots 32 and headed over at 36 to keep the side rails 26 rigid and parallel to one another. When installed, cage 24 is tied to cam race 18, and is thereby maintained generally coaxial to both races 14 and 18, with the side rails 26 generally perpendicular to the race axis. Additionally, for the purposes of accommodating the novel energizing spring 22 of the invention, each side rail 26 is stamped with a plurality of L shaped through slots 38, and an equal plurality of short angled slots 40. Side rails 26 and cross bars 34 together define a plurality of rectangular roller retention pockets 42, each of which sits over a respective cam ramp 16. The distance between the inside surfaces of the side rails 26 is designed to receive a roller 20 therebetween with some clearance from the ends of the roller 20. In the pocket 42, each roller sits on its respective cam ramp 16, and the side of the roller 20 that faces up the cam ramp 16 may be termed the far side of the roller 20, and the opposite side the near side. During clutch overrun, each roller 20 travels back and forth independently within its respective roller pocket 42, biased continually up the ramp 16 by its respective energizing spring 2, described next.

Figure 5:
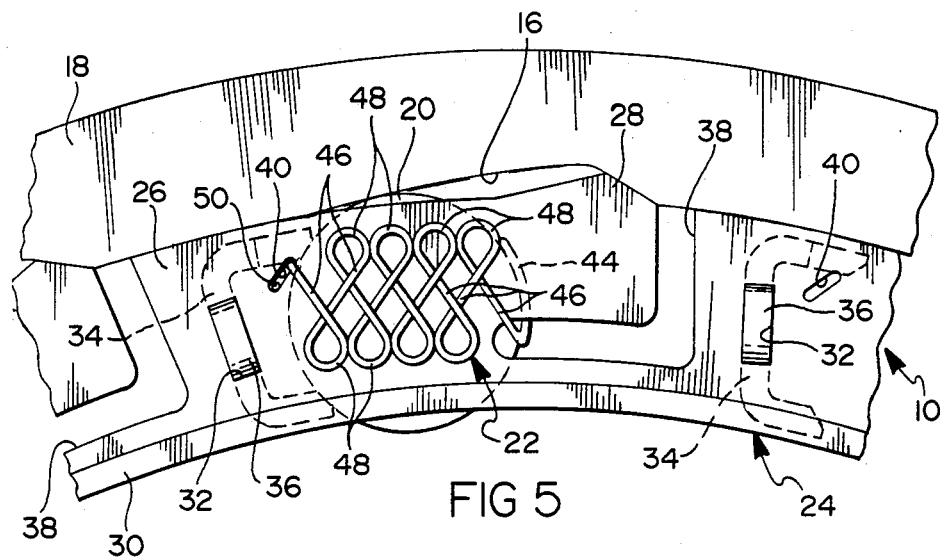
FIG. 5 is a view of a portion of a cam race after installation of the roller clutch of the invention, but before the pathway race has been added.

Referring next to FIGS. 4, 5 and 7, each energizing spring 22 is made of resilient wire and has a general U shape, as best seen in FIG. 7. The front of the U comprises the contact portion of the spring 22, and consists of a roller conforming front loop 44. Front loop 44 extends entirely between the inside of the side rails 26 in each retention pocket 42, and is generally perpendicular to the side rails 26, and therefore parallel to the clutch axis. The sides of the U comprise the active portion of spring 22, and each consists of a linked series of four V shaped folds 46 that are disposed generally in a plane. The folds 46 are linked at eight loops 48, rather than at sharp corners, so that as the folds 46 expand, the loops 48 contract, although the spring 22 as a whole is put effectively into tension. The forwardmost V folds 46 are each joined rigidly to an end of the contact loop 44, generally perpendicular thereto. The end of each rearmost V fold 46 is crimped into a flat 50, best seen in FIG. 7, and constitutes the base of spring 22. As best seen in FIG. 3, spring 22 is attached by popping flats 50 into slots 40, and stretching spring 22 out until front loop 44 can be inserted down into the aligned pairs of L shaped slots 38. Spring 22 will then pull roller 22 back into the cross bar 34 and retain it there for shipping purposes, as seen in FIG. 5.

Figure 8:
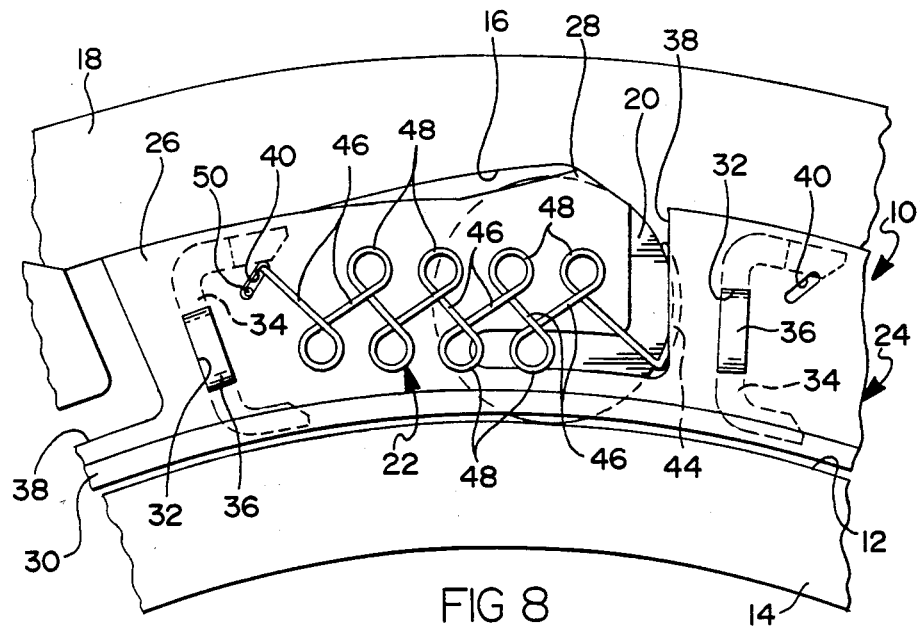
FIG. 8 is a view like FIG. 6, but showing an extreme position of the roller.

Referring next to FIGS. 6, 7 and 8, when the inner race 14 is added by the well known ringing-in method, roller 20 is shifted down cam ramp 16 and spring 22 is stretched out from its shipping position. Specifically, the V folds 46 widen, the loops 48 contract somewhat, and the spring 22 is put overall into greater tension. Spring 22 thereby pulls the roller 22 up the cam ramp 16 to ready position, rather than pushing it up. Since the contact loop 44 engages the far side of the roller 20, it has a greater working length, for the same available space, than would a conventional, accordion type compression spring, which is limited in its length to the space available between the cross bar 34 and the near side of the roller 20. The longer working length alone, with the high number of V folds 46 and linking loops 48, will minimize stress concentrations in the spring 22 and improve operation. More fundamentally, the V folds 46 are located outside of the pocket 42, and are thus totally protected from direct contact and wear by the roller 20. The V folds 46 are protected from the outside by the fact that the headed over ends 36 of the cross bar 34 extend beyond them. The V folds 46 are also protected from the potential ill effects of warping, twisting and over compression that could result, in a conventional spring, from having to follow the roller 20 inside the roller pocket 42. Furthermore, the spring 22 helps to limit roller skew. Comparing FIGS. 6 and 8, two possible positions of roller 20 and spring 22 are shown, FIG. 8 being the most extreme, pop-out position. As the V folds 46 open and close, they will be guided by the outside surfaces of the cage side rails 26, along which they closely extend. Being so guided, the V folds 46 will keep the contact loop 44, and therefore the roller 20, generally perpendicular to the side rails 26, parallel to the race axis. This is a degree of roller skew control that the conventional spring cannot provide.

Variations of the preferred embodiment may be made within the spirit of the invention. The spring could be a compression spring, one that pushed on on the near side of the roller, but still had its side portions located outside of the cage side rails, outside of the roller pocket. The spring would still be guided and protected, but would lose significant working length, roughly a roller's diameter worth. Also, there is more inherent stability in pulling on a rolling object, as opposed to pushing on it, as a conventional spring does. Many other configurations for the active side portions of the spring would be possible. So long as they extended outside of and along the cage side rails, they would be protected, and if they extended closely along the side rails, they would also be fairly rigorously guided. The side portions of the spring do not have to absolutely planar, but if they are substantially so, they can receive closer guidance from the side rails. The particular spring 22 shown, with its four V folds 46 and eight linking loops 48 disposed in a plane is very advantageous in terms of stress distribution and close guidance by the side rails 26. Therefore, it will be understood that the invention is not intended to be limited to just the embodiment disclosed.

The embodiments of the inventions in which an exclusive property or privilege is claimed are defined as follows:

1. In a one way roller clutch of the type that is installed between a pair of substantially coaxial clutch races and in which each of a complement of rollers is contained within a roller retention pocket defined by spaced cage side rails and in which said rollers move back and forth within said retention pockets as said clutch operates, an improved energizing spring for said rollers, said energizing spring comprising,
   a base portion attached to said cage,
   a contact portion extending axially between the inside of the side rails of said roller pocket and engaging said roller along one side thereof, and,
   a pair of generally parallel active portions, each extending from said base portion outside of and along a respective side rail and then through said side rail to said contact portion,
   whereby said active portions of said spring are protected by said side rails from said roller as it moves within said retention pocket.

2. In a one way roller clutch of the type that is installed between a pair of substantially coaxial clutch races and in which each of a complement of rollers is contained within a roller retention pocket defined by spaced cage side rails that are substantially perpendicular to said race axis, and in which said rollers move back and forth within said retention pockets as said clutch operates generally parallel to said race axis, but are subject to forces tending to skew said rollers away from said race axis, an improved energizing spring for said rollers, said energizing spring comprising,
   a base portion attached to said cage,
   a contact portion extending axially between the inside of the side rails of said roller retention pocket substantially perpendicular to said side rails and engaging said roller along one side thereof, and,
   a pair of generally parallel and planar active portions, each extending from said base portion closely along the outside of a respective side rail and then through said side rail to said contact portion,
   whereby said active portions of said spring, as they energize said roller, are protected by said side rails from said roller and also guided by said side rails so as to maintain said contact portion substantially perpendicular to said cage side rails, thereby reducing any potential skew of said roller.

3. In a one way roller clutch of the type that is installed between a cylindrical pathway on one clutch race and a circumferentially spaced series of sloped cam ramps on another, substantially coaxial clutch race and in which each of a complement of rollers is contained within a roller retention pocket defined by spaced cage side rails that are substantially perpendicular to said race axis and located over a respective cam ramp, and in which said rollers move back and forth on said cam ramps and within said retention pockets as said clutch operates generally parallel to said race axis, but are subject to forces tending to skew said rollers away from said race axis, an improved energizing spring for said rollers, said energizing spring comprising,
   a base portion attached to said cage on one side of said roller,
   a contact portion extending axially between the inside of the side rails of said roller retention pocket substantially perpendicular to said side rails and engaging said roller along the other side thereof, and,
   a pair of generally parallel and planar active portions, each extending from said base portion closely along the outside of a respective side rail and then through said side rail to said contact portion and acting in tension so as to continually pull said roller toward said base portion and up its respective cam ramp,
   whereby said active portions of said spring have a maximized length and, as they pull on said roller, are protected by said side rails from said roller and also guided by said side rails so as to maintain said contact portion substantially perpendicular to said cage side rails, thereby reducing any potential skew of said roller.

* * * * *